United States Patent
Freisler et al.

(10) Patent No.: US 9,889,814 B2
(45) Date of Patent: Feb. 13, 2018

(54) AIRBAG

(71) Applicant: TRW AUTOMOTIVE GMBH, Alfdorf (DE)

(72) Inventors: Werner Freisler, Heubach (DE); Tomasz Pys, Czestochowa (PL)

(73) Assignee: TRW Automotive GmbH (DE)

( * ) Notice: Subject to any disclaimer, the term of this patent is extended or adjusted under 35 U.S.C. 154(b) by 172 days.

(21) Appl. No.: 14/911,041

(22) PCT Filed: Jul. 28, 2014

(86) PCT No.: PCT/DE2014/000385
§ 371 (c)(1),
(2) Date: Feb. 9, 2016

(87) PCT Pub. No.: WO2015/024545
PCT Pub. Date: Feb. 26, 2015

(65) Prior Publication Data
US 2016/0176379 A1    Jun. 23, 2016

(30) Foreign Application Priority Data
Aug. 23, 2013  (DE) .................. 10 2013 013 979

(51) Int. Cl.
*B60R 21/231* (2011.01)
*B60R 21/235* (2006.01)

(52) U.S. Cl.
CPC .. B60R 21/231 (2013.01); *B60R 2021/23169* (2013.01); *B60R 2021/23571* (2013.01)

(58) Field of Classification Search
CPC .................. B60R 21/231; B60R 21/16; B60R 2021/23169; B60R 2021/2357
USPC ........................................................ 280/730.1
See application file for complete search history.

(56) References Cited

U.S. PATENT DOCUMENTS

| | | | |
|---|---|---|---|
| 5,975,571 A | 11/1999 | Ford et al. | |
| 8,393,638 B2* | 3/2013 | Gottschalk | B60R 21/206 280/730.1 |
| 9,010,804 B2* | 4/2015 | Witt, Jr. | B60R 21/2338 280/743.2 |
| 9,669,793 B2* | 6/2017 | Jung | B60R 21/206 |

(Continued)

FOREIGN PATENT DOCUMENTS

DE    102006051218    11/2007

*Primary Examiner* — Karen Beck
(74) *Attorney, Agent, or Firm* — Tarolli, Sundheim, Covell & Tummino LLP

(57) ABSTRACT

An airbag, especially for a vehicle occupant restraint system, in the inflated condition includes a front side (112) forming the occupant impact surface and an opposite rear side (114), wherein the cover portions (102a, 102b, 102c) forming the front side (112) and the rear side (114) are interconnected at their longitudinal edges (110). Along a center line (M) of the respective side extending in the longitudinal direction of the airbag (100) the front side (112) is longer than the rear side (114) so that in the inflated condition the airbag (100) takes a curved shape. The front side (112) and, resp., the rear side (114) includes at least one connecting line (108) substantially extending transversely to the center line (M) at which two cover portions (102a, 102c) are interconnected, wherein at least one of the cover portions (102a) in the cut includes a boundary contour (104) concavely or convexly extending transversely to the center line (M).

10 Claims, 2 Drawing Sheets

(56) References Cited

U.S. PATENT DOCUMENTS

| | | | |
|---|---|---|---|
| 2009/0058052 A1* | 3/2009 | Ford | B60R 21/206 |
| | | | 280/730.1 |
| 2011/0095512 A1 | 4/2011 | Mendez | |
| 2011/0260434 A1* | 10/2011 | Gottschalk | B60R 21/206 |
| | | | 280/730.2 |
| 2013/0020787 A1 | 1/2013 | Abele et al. | |

* cited by examiner

AIRBAG

RELATED APPLICATIONS

This application corresponds to PCT/DE2014/000385, filed Jul. 28, 2014, which claims the benefit of German Application No. 10 2013 013 979.1, filed Aug. 23, 2013, the subject matter, of which are incorporated herein by reference in their entirety.

BACKGROUND OF THE INVENTION

The invention relates to an airbag, especially for a vehicle occupant restraint system, wherein the airbag in the inflated condition includes a front side forming an occupant impact surface and an opposite rear side and the cover portions of the airbag constituting the front side and the rear side are interconnected at their longitudinal edges. Along a center line of the respective side extending in the longitudinal direction of the airbag the front side is longer than the rear side so that in the inflated condition the airbag takes a curved shape.

An airbag of this type is known, for example, from DE 10 2011 014 135 A1 or from DE 10 2006 051 218 A1. In said documents a dart or, resp., a shortened insert which is inserted on the rear side and is shortened in total ensures that the entire rear side is shorter than the front side which enforces a curved shape of the airbag.

However, a drawback in this case is the complicated manufacture of the edge seam which interconnects the rear side and the front side along the longitudinal edges thereof, as the dimensions of the front and rear sides differ from each other. This also restricts the dimension of the maximum achievable curvature.

SUMMARY OF THE INVENTION

It is the object of the invention to improve an afore-mentioned airbag and to facilitate the manufacture thereof.

This is achieved in that in an afore-mentioned airbag the rear side has at least one connecting line extending substantially transversely to the center line at which two cover portions are interconnected, wherein at least one of the cover portions has a boundary contour concavely extending transversely to the center line in the cut. Alternatively or additionally the front side may include at least one connecting line extending substantially transversely to the center line at which two cover portions are interconnected, wherein at least one of the cover portions has a boundary contour convexly extending transversely to the center line in the cut. A concave boundary contour causes a shortening of the rear side while a convex boundary contour entails a lengthening of the front side. In each case the airbag curves in the direction of the rear side.

By the use of the convex and, resp., concave boundary contours the difference in length is shifted from the longitudinal edges of the cover portions to the surface thereof. Therefore the formation of folds at the longitudinal edges is reduced (the longitudinal edges are the delimitations of the cover portions along which the cover portions of the front and rear sides are interconnected).

The longitudinal edges of the front side and the rear side can especially have the same length. This allows connecting the connection of the cover portions forming the front and rear sides along the longitudinal edges while being completely flatly superimposed.

Preferably the connecting line is a seam, but it could also be formed e.g. by a glued or welded connection.

In a possible embodiment the airbag includes a one-piece cut. The latter can theoretically be subdivided into plural integrally merging cover portions, wherein the two end-face edges of the cut belonging to two different cover portions are interconnected so as to form the connecting line.

In another preferred embodiment the airbag has a multi-part cut wherein on the front side and/or on the rear side at least one cover portion in the form of a separate insert is provided which is connected to a further cover portion at a connecting line.

The insert preferably exhibits a out having at least one boundary contour concavely or convexly extending transversely to the center line.

Alternatively or additionally the cover portion which is connected to an insert at a connecting line may exhibit a cut having a boundary contour concavely or convexly extending transversely to the center line.

The use of one or more inserts increases the flexibility when shaping the airbag, as in this way shapes of airbags can be realized which would not be possible by a one-piece cot or would be detrimental due to a great deal of cutting scrap.

The cut of each individual cover portion can be preferably spread two-dimensionally. The later three-dimensional shape of the airbag can exclusively be formed by sewing up the concave and, resp., convex boundary contours.

It is possible to connect on the rear side two concave boundary contours at adjacent cover portions or correspondingly on the front side two convex boundary contours.

Inside the airbag moreover at least one tether connected at a connecting line to at least one cover portion may be provided. The tethers in the interior may additionally contribute to the shaping and to the curvature of the airbag. When the cover portions are sewed up with the tethers provided anyway, no additional seams are required.

The connection of the tether at the connecting line to the cover portion is preferably offset on the front side relative to the longitudinal extension of the center line vis-à-vis the connection of the tether to the connecting line on the mar side so that the tether on the front and rear sides acts on different positions relative to the longitudinal extension of the respective side. The curvature of the airbag can be influenced by this offset.

Preferably the airbag is a knee airbag and especially in the inflated state extends in a curved shape along the instrument panel.

The total dimension of the extension and, resp., the shortening is resulting from the curvature of the respective boundary contour, i.e. the distance of the center of the concave and, resp., convex boundary contour from a line across the two end points at which the boundary contour abuts against the longitudinal edges of the respective cover portion, as well as from the total number of the cover portions having curved boundary contours. In this way, by the variation of the boundary contours of the cover parts the shape of the airbag can be realized to have a desired curvature and can be adapted to the respective vehicle conditions without great expenditure of material, without substantial modification of the design of the airbag and without any further manufacturing steps, as they are required, for example, to introduce separately sewed-in inserts or darts.

An airbag of this type is suited in an especially advantageous manner for a knee airbag module in a so-called "low-mounted" version. Knee airbag modules of this type are arranged outside the visual range at the lower side of the instrument panel. During deployment the housing of such module opens downwards so that the airbag deploys first downwardly and then in a curved shape upwardly and in the direction of the vehicle occupant. Hence the airbag must have a strongly bent shape and deploy in a curved shape between the instrument panel and the lower legs and knees of the vehicle occupant.

BRIEF DESCRIPTION OF THE DRAWINGS

Hereinafter the invention shall be described in detail by way of two embodiments with reference to the enclosed drawings in which.

DESCRIPTION

Figure 1:
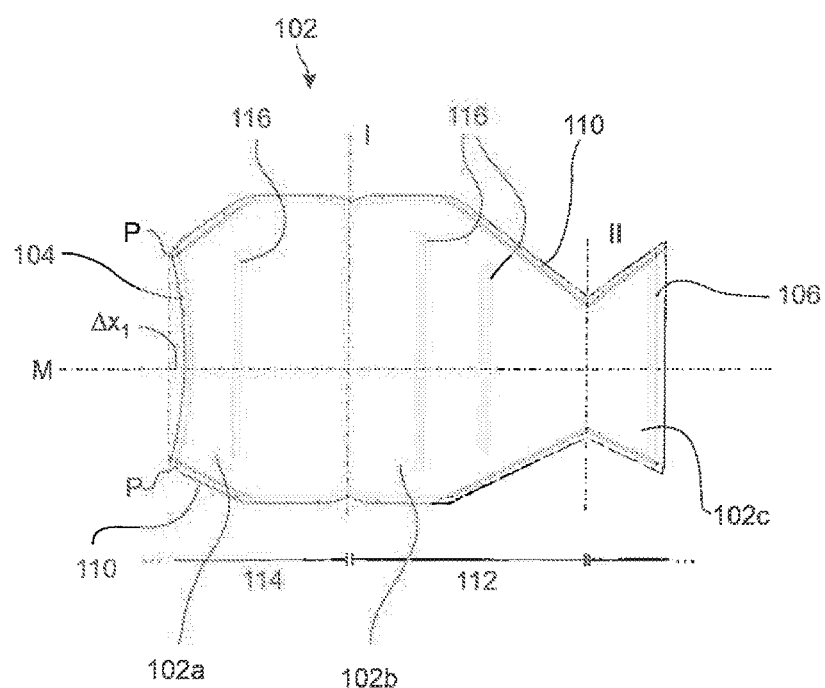
FIG. 1 shows a cut of an airbag according to the invention in accordance with a first embodiment.

FIG. 1 illustrates the cut of an airbag 100, the latter consisting of one single one-piece flatly outspread cut 102. For the following contemplation, the cut 102 is theoretically subdivided into three merging cover portions 102a, 102b and 102c.

Figure 2:
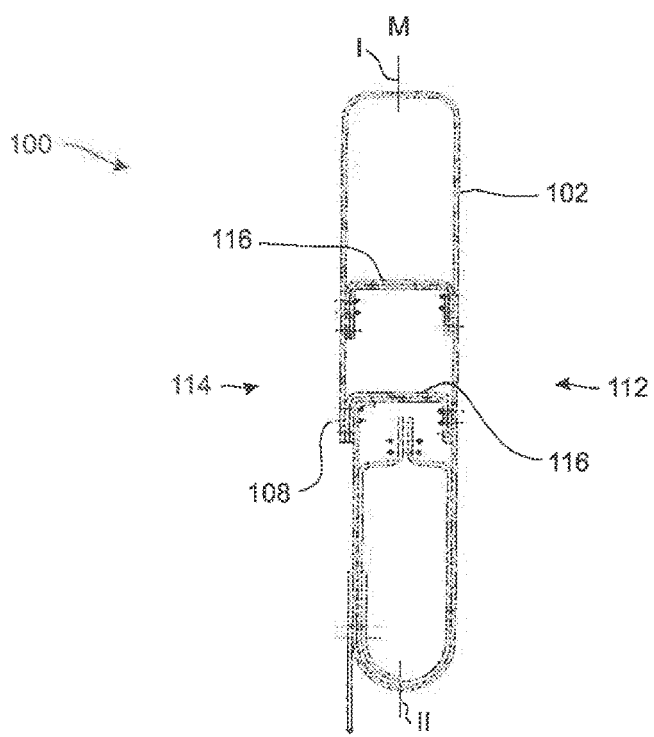
FIG. 2 shows a schematic sectional view of the joined but not inflated airbag from FIG. 1.

FIG. 2 shows the airbag 100 which is formed by folding the cover portion 102a about the line 1 in FIG. 1, by folding the cover portion 102c about the line II and sewing up the boundary contour 104 of the cover portion 102a with the boundary contour 106 of the cover portion 102c along a connecting line 108 (see FIG. 2). Furthermore, the flatly superimposed longitudinal edges 110 of the cover portions 102a-c are sewed up so that a closed bag is formed.

The cover portion 102b between the lines I and II forms the front side 112 of the airbag 100, while the cover portions 102a, 102c which are located on the right of the line II and on the left of the line I altogether form the rear side 114 of the airbag 100.

The front side 112 constitutes an occupant impact surface in the inflated state of the airbag (not shown) and faces a vehicle interior and the vehicle occupant, while the rear side 114 faces a vehicle lining and covers the same.

The boundary contour 104 is concavely shaped vis-à-vis an imaginary center line M extending substantially perpendicularly to the boundary contours 104, 106 across the airbag 100 so that the area of the boundary contour 104 located on the center line M is recessed by an offset $\Delta x_1$ vis-à-vis the points P located on the longitudinal edges 110.

In this example the boundary contour 106 is formed to be straight at the cover portion 102, but it might as well have a concave shape.

While the superimposed longitudinal edges 110 have the same length on the front and rear sides 112, 114 and therefore can be joined two-dimensionally, from the connection of the boundary contours 104 and 106 a slightly three-dimensionally curved connecting line 108 is resulting by virtue of the concave shape of the boundary contour 104. The offset $\Delta x_1$ ensures that, viewed along the center line M, the rear side 114 is shorter than the front side 112. Due to this difference in length, during inflation the airbag 100 curves toward the rear 114.

The airbag 100 shown here is a knee airbag which in the inflated state covers an instrument panel (not shown) of the vehicle by extending around the same in curved shape.

Two tethers 116 which in this case extend straightly through the airbag 100 extend inside the airbag 100, wherein the lower one of the tethers 116 in FIG. 2 is fixed by the connecting line 108.

Figure 3:
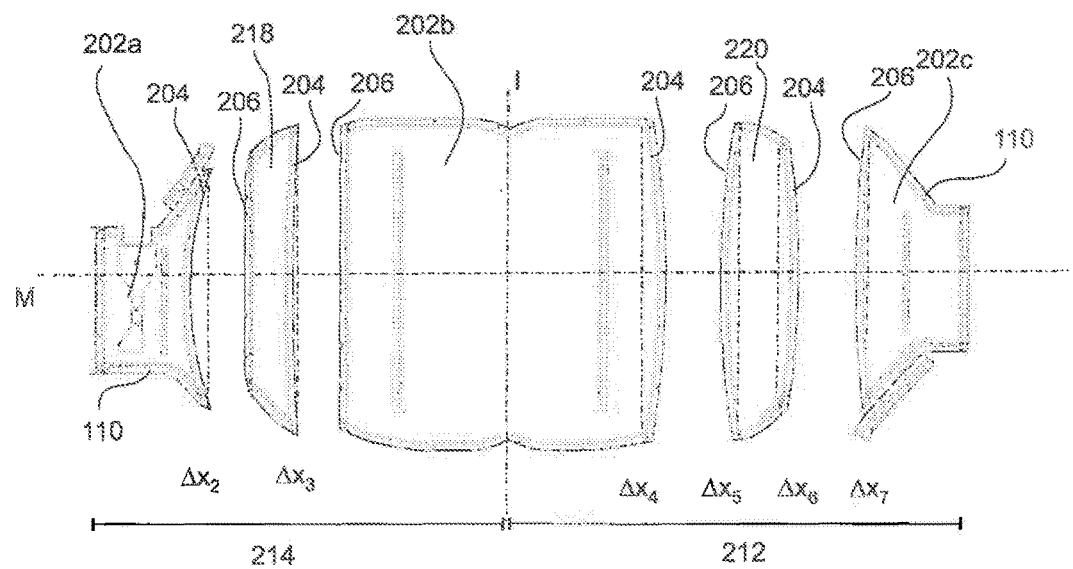
FIG. 3 shows the cut of an airbag according to the invention in accordance with a second embodiment.
Figure 4:
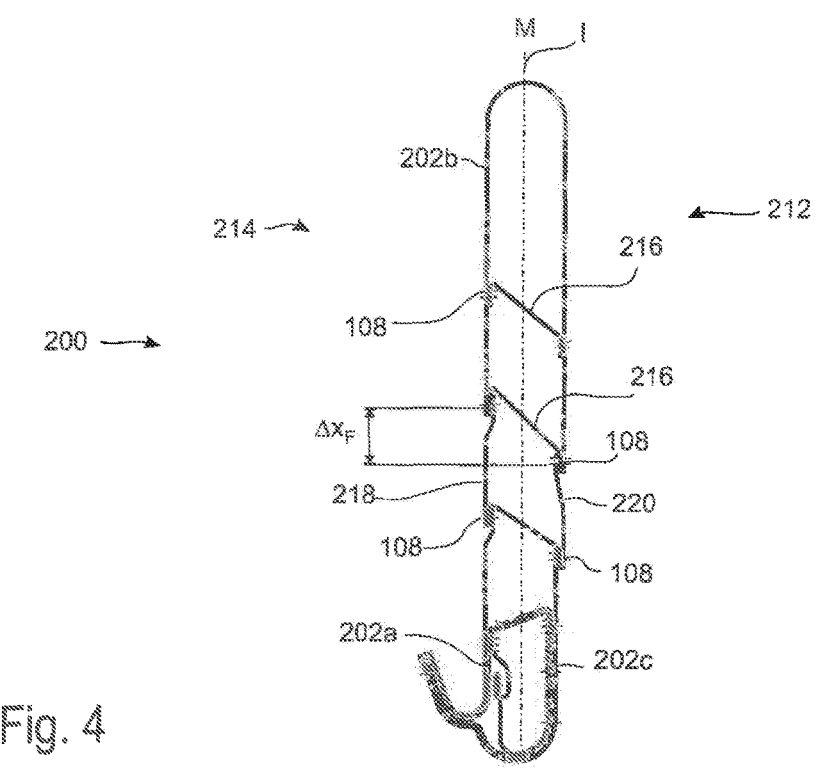
FIG. 4 shows a schematic sectional view of the joined but not inflated airbag from FIG. 3.

The FIGS. 3 and 4 illustrate a second embodiment of an airbag 200, wherein in FIG. 3 the flatly spread cut is shown while FIG. 4 shows the joined but not inflated airbag.

The out of the airbag 200 has a multi-part design, with three separate cover portions 202a, 202b and 202c being provided between which two further cover portions formed as separate inserts 218 and 220 are arranged.

The cover portions 202a, 218 and 202b (In FIG. 3 from the left to the line I) in the finished airbag constitute the rear side 214 of the airbag 200. Accordingly, the cover portions 202c, 220 and the right-hand part of the cover portion 202b up to the line I constitute the front side 212 of the airbag 200.

For manufacturing the airbag 200 the central cover portion 202b in FIG. 3 is folded about the line I (the line I forms the upper vertex of the airbag 200). The two right and left cover portions 202a, 202c In FIG. 3 together form the lowermost part of the airbag 200 and also accommodate the inferior for filling the airbag 200 (not shown here).

The first insert 218 is located between the cover portion 202a and the cover portion 202b and is connected at its boundary contour 206 directed toward the cover portion 202a to the boundary contour 204 thereof directed toward the insert 218 along a connecting line 108. Accordingly, the boundary contour 204 of the insert 218 which is directed toward the central cover portion 202b is connected to the boundary contour 206 thereof which is directed toward the insert 218. The boundary contour 206 of the cover portion 202c directed toward the insert 220 and the boundary contour 204 of the insert 220 directed toward the cover portion 202c are connected along a connecting line 108. Correspondingly, the boundary contour 206 of the insert 220 directed toward the cover portion 202b is connected to the boundary contour 204 thereof which is directed toward the insert 220 along a connecting line 108.

In the example shown here soma of the boundary contours 204 of the rear side 214 have a concave shape, i.e. the boundary contour 204 of the cover portion 202a as west as the boundary contour 204 of the insert 218. The corresponding boundary contours 206 of the insert 218 and of the cover portion 202b have a straight shape in this example, however. For the boundary contour 204 of the cover portion 202a a larger curvature is chosen than for the boundary contour 204 of the insert 218.

The boundary contours 204, 206 of the front side have a convex shape in this case. The deviations $\Delta x_2$ to $\Delta x_7$ from the straight line are indicated in FIG. 3 by respective dot-dashed lines.

As the deviations sum up, the rear side 214 is shortened by the amount $\Delta x_2 + \Delta x_3$ vis-à-vis an airbag cut having straight boundary contours. Correspondingly, the front side 212 is extended by the sum of the distances of the boundary contours 204, 206 from the straight line relative to the center line M by the amount $\Delta x_4 + \Delta x_5 + \Delta x_6 + \Delta x_7$.

The longitudinal edges 110 of the front side 212 and the rear side 214, on the other hand, have the same length for the entire front and rear sides 212, 214. Due to the difference in length along the center line M between the front side 212 and the rear side 214 the airbag 200 will curve toward its rear side 214 during inflation.

Both the curvatures of the boundary contours 204, 206 on the front side 212 and those on the rear side 214 are divided in this example over plural connecting lines 108 so that the respective curvature of the individual connecting lines 108 is limited. Nevertheless, a sufficient overall curvature of the airbag 200 is achieved with proper sewing capability and minimal folding along the connecting lines 108.

Within the discretion of those skilled in the art that are able to vary both the number of the curved boundary contours 204, 206 and the degree of curvature thereof as well as the number of inserts 218, 220 used on the front and rear sides 212, 214 of the airbag 200 at will so that the airbag 200 is adapted to the respective intended use, the desired longitudinal extension and the desired curvature.

In this embodiment, too, inside the airbag tethers 116 are arranged which extend between the front side 212 and the rear side 214. The tethers 216 in this case are fastened to the front and rear sides 212, 214 with an offset relative to the center line M which is denoted with the amount $\Delta x_F$. The tethers 216 are fastened, where appropriate, to the connecting lines 108 of the cover portions and inserts so as to avoid additional seams. However, it would also be possible to choose the mounting points of the tethers 216 independently of the connecting lines 108.

The invention claimed is:

1. An airbag, especially for a vehicle occupant restraint system, wherein the airbag (100; 200) in the inflated state includes a front side (112, 212) forming an occupant impact surface and an opposite rear side (114; 214) cover portions (102*a*, 102*b*, 102*c*; 202*a*, 202*b*, 202*c*, 218, 220) of the airbag (100; 200) forming the front side (112; 212) and the rear side (114; 214) are interconnected at their longitudinal edges (110), the front side (112; 212) being longer along a center line (M) of the respective side extending in the longitudinal direction of the airbag (100; 200) than the rear side (114; 214) so that in the inflated condition the airbag (100; 200) takes a curved shape, wherein the rear side (114; 214) has at least one connecting line (108) substantially extending transversely to the center line (M) at which the two cover portions (102*a*, 102*c*; 202*a*, 218, 202*b*) are interconnected, wherein at least one of the cover portions (102*a*, 202*a*, 218) is cut to include a boundary contour (104; 204) concavely extending transversely to the center line (M), and/or the front side (112; 212) includes at least one connecting line (108) substantially extending transversely to the center line (M) at which two cover portions (202*b*, 202*c*, 220) are interconnected, wherein at least one of the cover portions (202*b*, 202*c*, 220) in the cut includes a boundary contour (204, 206) convexly extending transversely to the center line (M).

2. The airbag according to claim 1, wherein the longitudinal edges (110) of the front side (112; 212) and the rear side (114; 214) have the same length.

3. The airbag according to claim 1, wherein the airbag (100) has a one-piece cut.

4. The airbag according to claim 1, wherein the airbag (200) has a multi-part cut, wherein on the front side (212) and/or on the rear side (214) at least one cover portion in the form of a separate insert (218, 220) is provided which is connected to a further cover portion (202*a*, 202*b*, 202*c*) along a connecting line (108).

5. The airbag according to claim 4, wherein the insert (218, 220) exhibits a cut including at least one boundary contour (204, 206) concavely or convexly extending transversely to the center line (M).

6. The airbag according to claim 4, wherein the cover portion (202*a*, 202*b*, 202*c*) which is connected to an insert (218, 220) along a connecting line (108) exhibits a cut having a boundary contour (204, 206) concavely or convexly extending transversely to the center line (M).

7. The airbag according to claim 1, wherein inside the airbag (100; 200) at least one tether (116; 216) is provided which is connected to at least one cover portion (102*a*, 102*b*, 102*c*; 202*a*, 202*b*, 202*c*, 218, 220) at a connecting line (108).

8. The airbag according to claim 7, wherein the connection of the tether (216) to the connecting line (108) on the front side (212) is offset relative to the longitudinal extension of the center line (M) vis-à-vis the connection of the tether (216) to the connecting line (108) on the rear side (214).

9. The airbag according to claim 1, wherein the airbag (100; 200) is a knee airbag.

10. The airbag according to claim 9, wherein in the inflated condition the knee airbag extends in a curved shape along the instrument panel.

* * * * *